(12) United States Patent
Dickson et al.

(10) Patent No.: US 12,318,042 B2
(45) Date of Patent: Jun. 3, 2025

(54) BLENDER CONTROL SYSTEM

(71) Applicant: BLENDTEC, INC., Orem, UT (US)

(72) Inventors: Thomas D. Dickson, Orem, UT (US);
David J. Throckmorton, Mapleton, UT (US); Cody Hardcastle, Lehi, UT (US)

(73) Assignee: BLENDTEC, INC., Orem, UT (US)

( * ) Notice: Subject to any disclaimer, the term of this patent is extended or adjusted under 35 U.S.C. 154(b) by 734 days.

(21) Appl. No.: 17/678,162

(22) Filed: Feb. 23, 2022

(65) Prior Publication Data
US 2022/0279976 A1  Sep. 8, 2022

Related U.S. Application Data

(60) Provisional application No. 63/155,536, filed on Mar. 2, 2021.

(51) Int. Cl.
*A47J 43/00* (2006.01)
*A47J 43/046* (2006.01)

(52) U.S. Cl.
CPC .................. *A47J 43/046* (2013.01)

(58) Field of Classification Search
CPC ................................... A47J 43/046
See application file for complete search history.

(56) References Cited

U.S. PATENT DOCUMENTS

| 10,328,402 | B2 | 6/2019 | Kolar et al. |
| 2008/0122648 | A1 | 5/2008 | Ebrom et al. |
| 2014/0269154 | A1* | 9/2014 | Kolar .................... H04L 12/282 366/241 |
| 2017/0221296 | A1 | 8/2017 | Jain et al. |

FOREIGN PATENT DOCUMENTS

WO     2020255115 A1    12/2020

OTHER PUBLICATIONS

PCT International Search Report and Written Opinion for Int'l Application No. PCT/US2022/017442 dated May 12, 2022.

* cited by examiner

*Primary Examiner* — Anshu Bhatia
(74) *Attorney, Agent, or Firm* — DORSEY & WHITNEY LLP

(57) ABSTRACT

Systems and methods are described herein for a blender control system to monitor the usage of a blender system. The blender control system may decrement a remaining blend runtime and/or remaining blend cycle count each time that the blender is used. The blender control system may disable or partially disable at least some functions of the blender system once the remaining blend runtime and/or remaining blend cycle count is depleted. Additional blend cycles and/or blend runtime may be purchased directly via an interface on the blender system, through a mobile application, by phone, or via a web portal. The blender control system replenishes the remaining blend runtime and/or remaining cycle count in response to the purchase.

20 Claims, 14 Drawing Sheets

BLENDER CONTROL SYSTEM

CROSS-REFERENCE TO RELATED APPLICATIONS

This application claims priority to U.S. Provisional Patent Application No. 63/155,536, filed 2 Mar. 2021, and entitled "BLENDER CONTROL SYSTEM," the entire disclosure of which is hereby incorporated by reference.

TECHNICAL FIELD

The present disclosure generally relates to blender systems. Specifically, this disclosure describes control systems for blenders used to make blended foods, such as juices and smoothies.

SUMMARY

According to some aspects of the present disclosure, a blender system can monitor usage of a blender, at least partially disable blending by the blender in response to a blend cycle count being insufficient to perform a requested blend cycle, increase the blend cycle count in response to a purchase of additional blend cycles, and reenable blending by the blender based on the increased blend cycle count.

In some examples, the blend cycle count includes a blend runtime. The blender system can include a user interface. The blend cycle count can be decremented by one in response to the requested blend cycle. The blend cycle count is decremented by more than one in response to the requested blend cycle. A blend cycle request that involves higher blend speeds or longer blend times can cause the blend cycle count to decrement by more than one. The blend cycle count can be decremented based on a runtime of a selected blend cycle.

In some examples, the blend cycle count can be decremented based on at least one of the blend speed of a selected blend cycle. The blender system can be connected to a mobile device. The blender system can be at least partially controlled through a mobile application interface. The blender system can estimate a remaining runtime until the blender system will be disabled, based on historical usage data. The blender system can include a processor, a memory, a communications interface, and a computer-readable medium.

According to some aspects, a method for operating a blender system can include receiving a request to initiate a blend cycle, determining if a remaining blend cycle count is sufficient to implement the requested blend cycle, initiating the requested blend cycle in response to determining that the remaining blend cycle count is sufficient to implement the blend cycle, and decrementing the remaining blend cycle count based on the initiated blend cycle.

In some examples, the method includes notifying a user if it is determined that the remaining blend cycle count is not sufficient to implement the requested blend cycle. The blend cycle can be associated with a number of blend cycles or a blend runtime. According to some aspects, a non-transitory computer-readable medium having stored contents that cause a device to perform operations can include receiving a request to initiate a blend cycle, determining, by the device, if a remaining blend cycle count is sufficient to implement the blend cycle, initiating, by the device, the blend cycle in response to determining that the remaining blend cycle count is sufficient to implement the blend cycle, and decrementing, by the device, the remaining blend cycle count based on the blend cycle.

In some examples, the operations can include increasing, by the device, the remaining blend cycles. The device can be connected to a centralized blender control system configured to operate multiple blenders. The operations can include managing multiple blender systems. The non-transitory computer-readable medium can be a mobile application executed on a mobile device.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

DETAILED DESCRIPTION

Figure 1A:
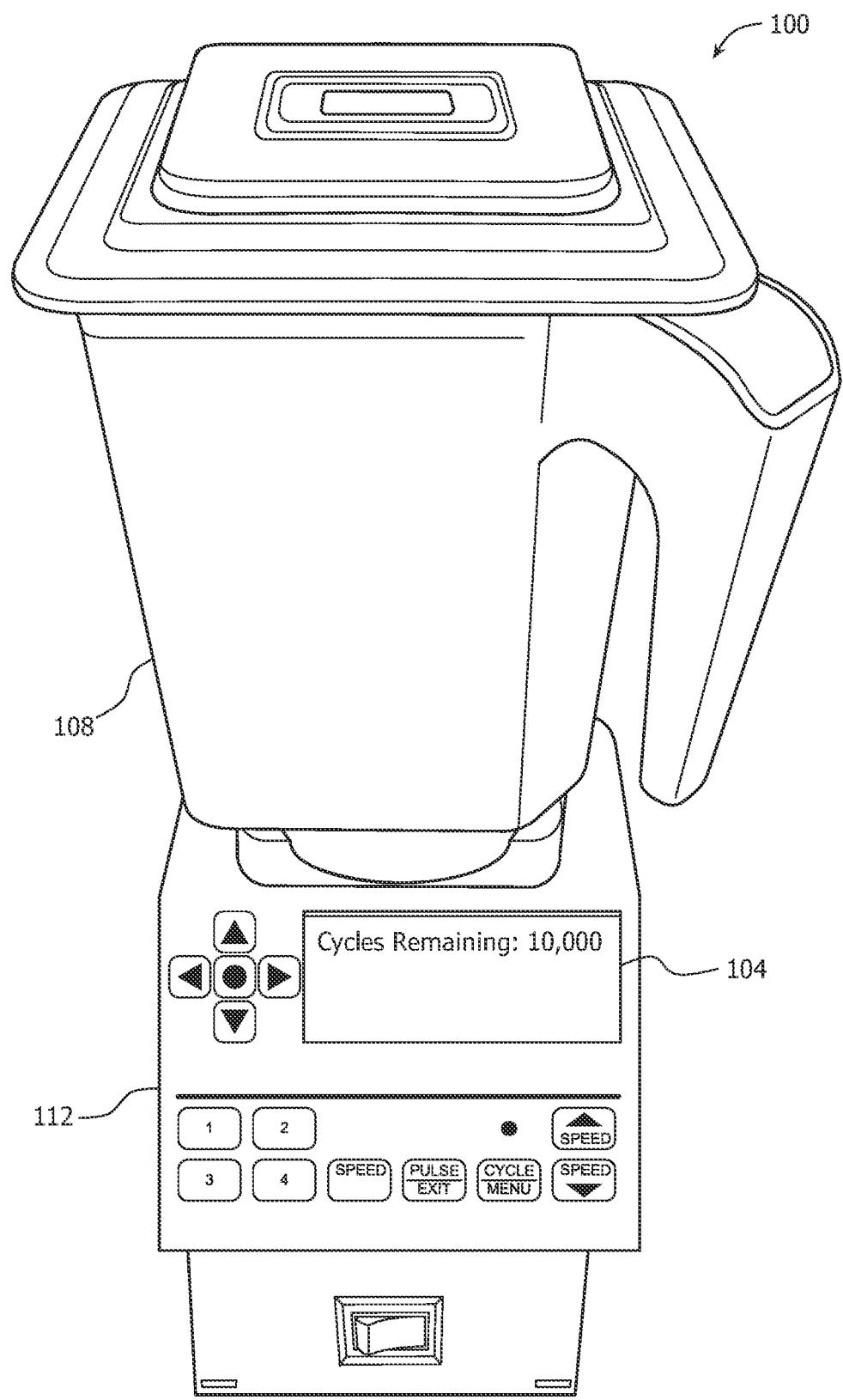
FIG. 1A illustrates a blender system with a digital display displaying the number of blend cycles remaining, according to one embodiment.

Various foods and/or liquids may be blended into smoothies, juices, and/or shakes. Many people are interested in blended foods to improve their health, increase their nutritional intake, and/or simplify their food preparation and cleanup. In addition, there are individuals who must eat blended foods due to serious illness, injury, or other medical conditions. Commercial businesses and consumers alike may purchase and use a blender until the blender fails.

In various embodiments, a blender may include a control interface through which a user may select a preprogrammed blend cycle, a blend speed, a blend time, and the like. During operation, a display interface may display the status of the blender or other information. In some instances, the display and control interface may be combined as a touch screen interface. A blender control system may control the operation of the motor to rotate a blade system within a jar of the blender. Traditionally, the blender may be used until one of these components fails.

According to various embodiments described herein, a blender control system limits operation of the blender according to a purchased number of blend cycles or a purchased runtime. The blender control system may disable or partially disable the blender once the purchased number of blend cycles or runtime has been exhausted. According to various embodiments, the blender control system may facilitate the purchase of additional blend cycles or runtime to re-enable the operation of the blender.

In many embodiments, the blender control system described herein may be integrated within the blender base or housing along with the motor and display. In other embodiments, the blender control system may be external to the blender base and motor housing. In some such embodiments, the blender control system may have its own electronic display or, alternatively, be controlled through a web or mobile app interface without any visual display and/or input interface.

Many of the examples and embodiments described herein are provided in the context of a blender. However, it is appreciated that many of the features, functionalities, monitoring capabilities, billing capabilities, reporting capabilities, and the like can be integrated into other types of appliances and devices. For example, similar systems and methods may be used to monitor an ice machine, a mixing machine, a soda dispenser machine, an oven, a toaster, a vacuum, a saw, a printer, a drill, and/or other appliances and devices.

Many aspects of the presently described approach of preventing the operation of a blender system until additional runtime is purchased can be implemented via a modified smart plug device. A smart plug device may be internally located within the housing of a blender system or external to the blender system (e.g., plugged into the wall outlet and configured to receive a standard or proprietary power plug of the blender system). The smart plug may track the runtime of the blender based on the current or power drawn by the blender system. Very low power consumption during an idle state of a blender may not count against the remaining runtime.

However, the actual use of the blender system for blending (e.g., operation of the motor) results in an increment of time with relatively large power consumption. Increments of time with relatively large power consumption may be counted against the remaining runtime. Once the remaining runtime is exhausted, the smart plug may cut the power to the blender system entirely. In other embodiments, when the remaining runtime is exhausted, the smart plug may limit the power to the blender system such that it can continue to display messages or allow for the purchase of additional runtime but cannot be used to blend. In some embodiments, the actual power consumption may vary depending on the blend speed.

In some embodiments, the remaining runtime or remaining blend cycle count may be decremented based on the time that the power consumption exceeds a threshold value. In other embodiments, the remaining runtime or remaining blend cycle count may be reduced as a function of the actual power consumed or in tiered thresholds of power consumption (e.g., low, medium, and high blend speeds).

In some embodiments, the blender control system may monitor power consumption and detect anomalies or changes in performance over time. Specific patterns or changes in power consumption, temperatures reported by a temperature sensor, vibrations detected by a sensor, and/or sounds detected by a sensor may be indicative of component failure. Repairs and/or replacements may be automatically scheduled and/or notices of abnormal performance may be reported by the blender control system.

In some embodiments, usage information from a blender may be compared with total sales and/or other information to identify potential equipment problems and/or incorrect usage. For example, if a blender is used to make 500 smoothies based on sales, but ran 600 cycles, feedback may be provided that the operators are filling the jar too much, using too cold of foodstuffs, adding too much ice, or otherwise using the blender incorrectly. Additionally, or alternatively, the blender may monitor usage statistics to identify end-of-life characteristics of one or more components of the blender. For example, specific temperature readings, vibrations, sounds, or other problems may be detected and reported. The centralized blender system may automatically ship a replacement unit based on the expected failure of the base unit, blender motor, jar, blades, or other components.

In some embodiments, the system and methods described herein may reduce theft and/or facilitate tracking and identifying theft of blender systems. For example, Internet-connected blender systems may provide location information and/or be disabled when reported stolen. Furthermore, the value of a stolen blender system is greatly reduced given that the blender system will cease to fully operate once the remaining blend cycle count is depleted.

In some embodiments, the integrated network connection within the blender (e.g., cellular, Wi-Fi, ZigBee, Bluetooth, etc.) may be used for software updates and programming as well. For example, a customer may utilize a mobile app or a web app to create a custom blend cycle. The custom blend cycle may, for example, be defined in terms of blender speed during different periods of time. The following provides a single example from which may variations can be extrapolated. A 40 second custom blend cycle may indicate a ramp up in blender speed from 0 to 100 during the initial 10 seconds, blend for 10 seconds at 100, decrease to speed 10 for 5 seconds, then ramp back up to 100 during the next 15 seconds.

The customer may upload the custom blend cycle to the blender using the integrated network connection. A digital display on the blender may make the custom blend cycle easily accessible. As another example, a corporation may identify a new recipe to be shared with each of a large plurality of stores in disparate locations. A custom blend cycle may be created for the new recipe. The corporate headquarters may automatically update all the blenders within many stores (e.g., coffee shops, smoothie shops, etc.) in disparate locations to include the new custom blend cycle.

According to various embodiments, the blender control system may be embodied as and/or include an application-specific integrated circuit (ASIC), a field-programmable gate array (FPGA), a programmable logic array (PLA), a microprocessor, a microcontroller, memory, a communication interface, a computer-readable medium, or the like. For example, the blender control system may be embodied as a field-programmable gate array configured to implement the operations described herein. In another embodiment, the blender control system may include instructions stored on a non-transitory computer-readable medium that, when executed by a processor, implement the operations described herein.

The embodiments of the disclosure can be further understood by reference to the drawings of some specific example embodiments, wherein like parts are designated by like numerals throughout. The components of the disclosed embodiments, as generally described and illustrated in the figures herein, could be arranged and designed in a wide variety of different configurations. Thus, the following description of the embodiments of the systems and methods of the disclosure is not intended to limit the scope of the disclosure, as claimed, but is merely representative of possible embodiments.

It is particularly appreciated that many of the components could be resized, reshaped, lengthened, shortened, etc. It is also appreciated that a wide variety of motors, cases, blender jar shapes, blender base shapes, connections, couplings, and fasteners could be utilized in addition to, or as alternatives to, those shown in the figures. In fact, many possible options and variations are intentionally not illustrated to avoid obscuring other aspects of the illustrated embodiments.

The various components described herein may be manufactured using a wide variety of metals, plastics, glasses, woods, and other materials known to be useful in manufacturing. In some cases, well-known structures, materials, or operations may not be shown or described in detail to avoid obscuring aspects of the disclosure. Furthermore, the described features, structures, or characteristics may be combined in any suitable manner in one or more alternative embodiments.

It is appreciated that various mechanical interfaces may be substituted with alternative mechanical components that provide a similar function. For example, press-fit interference fittings may be replaced with screw fittings, glued fittings, clamps, and the like. Detents, protrusions, depressions, snap fittings, press-fittings, rubber seals, screw fittings, interference fittings, and the like may be used interchangeably and/or in combination to accomplish the described functions.

The phrases "connected to," "coupled to," and "in communication with" refer to any form of interaction between two or more components, including mechanical, electrical, magnetic, and electromagnetic interaction, depending on the context. Two components may be connected to each other, even though they are not in direct contact with each other, and even though there may be intermediary devices between the two components.

FIG. 1A illustrates a blender system 100 with a digital display 104 displaying the number of blend cycles remaining, according to one embodiment. According to various embodiments, the blender system 100 may receive a request to initiate a blend cycle (e.g., a preprogrammed blend cycle, a blend speed, a blend time, etc.). The blender control system determines if there are pre-purchased cycles remaining. In the illustrated embodiment, 10,000 cycles remain and so the blender control system will respond to the request by causing the base or motor 112 to rotate the blades within the blender jar 108 according to the requested blend cycle.

The blender control system may then decrement the remaining blend cycles. The remaining blend cycles may be decremented by 1 regardless of the blend cycle requested by the user. In other embodiments, some selectable blend cycles may result in the remaining blend cycle count being decremented by more than 1. For example, some blend cycles that utilize higher speeds and/or longer blend times may count as two 2 or three 3 blend cycles. In some embodiments, the remaining blend cycle count may be decremented based on the runtime of the selected blend cycle (e.g., every 15 seconds of blend time equals 1 blend cycle count).

In some embodiments, the remaining blend cycle count may be decremented based on a function of the blend speed and the runtime of the selected blend cycle. For example, the blender system 100 may be operated between blend speeds 1 and 100 for various durations of time. A blender usage value of a selected blend cycle may be calculated as a function of the blend speed and the runtime. For example, 15 seconds of blending at a blend speed of 100 may be equal to the same number of blend cycle counts as 30 seconds of blending at a blend speed of 50, or 60 seconds of blending at a blend speed of 25. Preprogrammed blend cycles may include different blend speeds for different amounts of time. Accordingly, some preprogrammed blend cycles may result in the remaining blend cycle count being decremented by 1, while other preprogrammed blend cycles may result in the remaining blend cycle count being decremented by more than 1.

The blender control system may disable the operation of the blender system 100 when the remaining blend cycle count reaches zero (0). In other embodiments, the blender control system may partially disable the operation of the blender system 100 when the remaining blend cycle count reaches zero (0). For example, the blender control system may continue to allow manual blending by holding down a "pulse" button, while disabling preprogrammed blend cycles. As another example, the blender control system may limit the blend speed until additional blend cycles are purchased or otherwise added to the blender system 100.

Figure 1B:
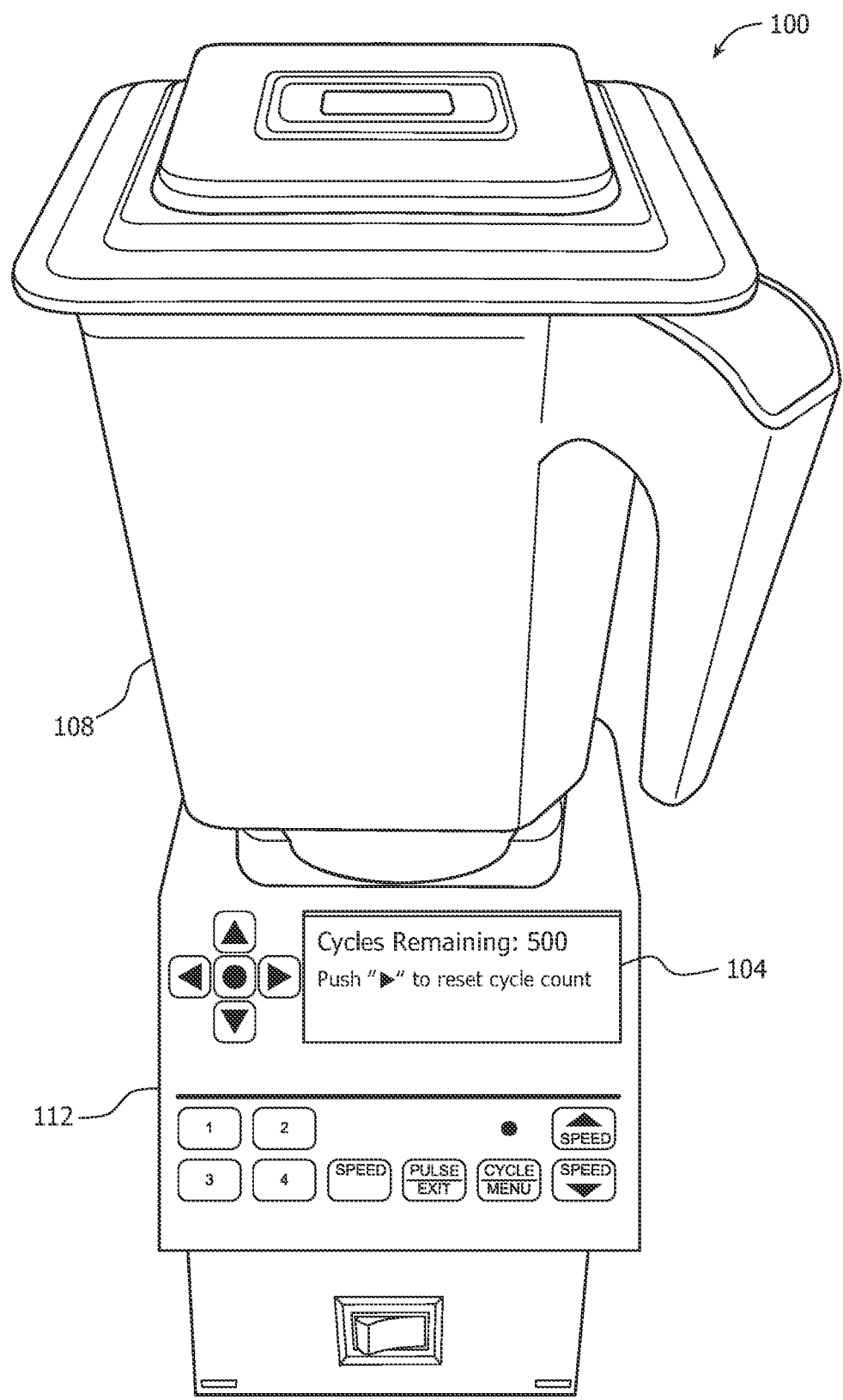
FIG. 1B illustrates the blender system of FIG. 1A with 500 blend cycles remaining and instructions for resetting the blend cycle count, according to one embodiment.

FIG. 1B illustrates the blender system 100 of FIG. 1A with 500 blend cycles remaining and instructions for resetting the blend cycle count, according to one embodiment. In various embodiments, additional blend cycles may be purchased in various increments and added to the blender system 100 at any time using any of the various approaches described herein.

Figure 1C:
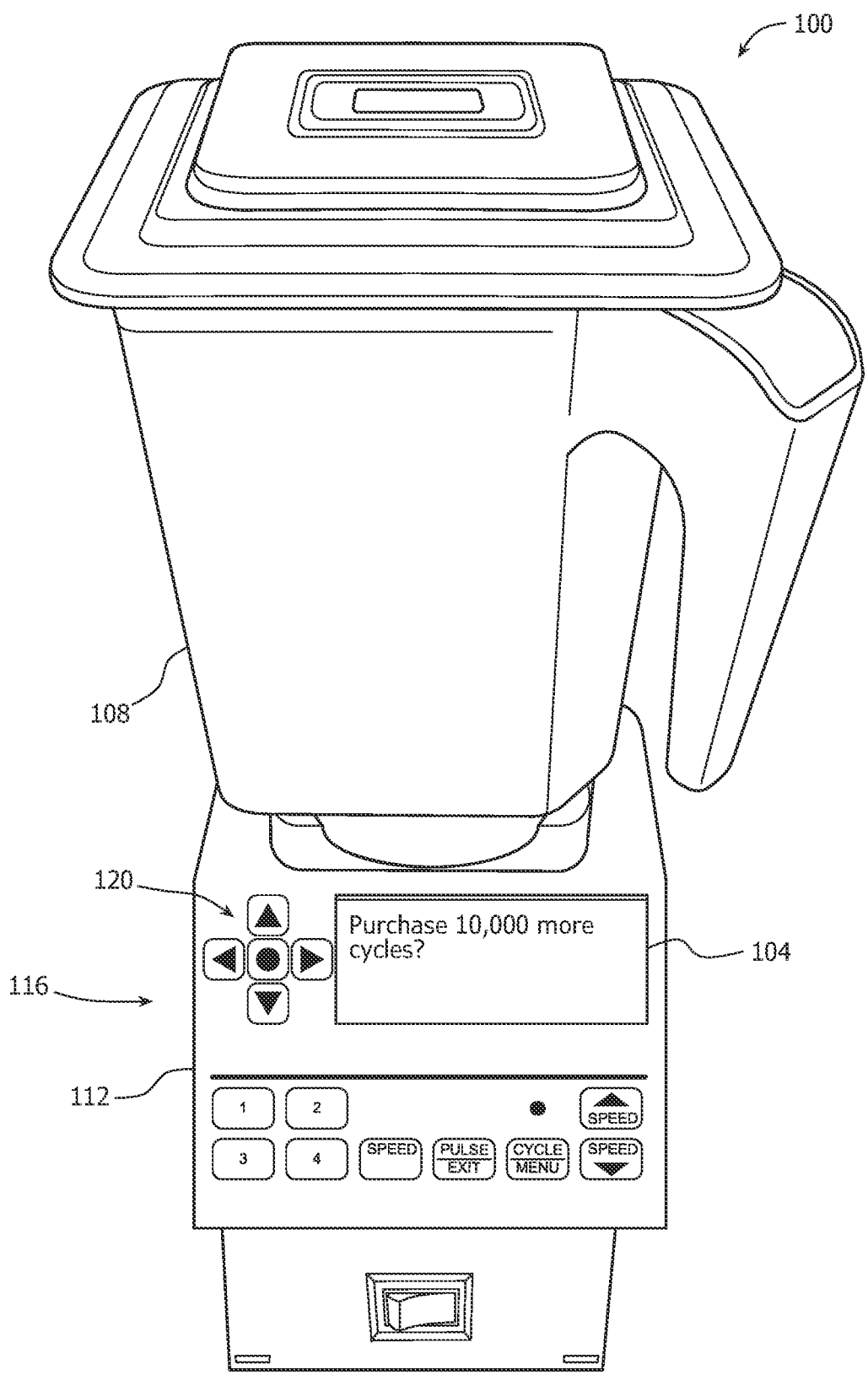
FIG. 1C illustrates the blender system of FIG. 1A with a user interface allowing for the user-selection of a number of additional blend cycles to purchase, according to one embodiment.

FIG. 1C illustrates the blender system 100 of FIG. 1A with a user interface 116 allowing for the user-selection of a number of additional blend cycles to purchase, according to one embodiment. In various examples, the user may use the arrow buttons 120 or a numeric keypad (not shown) to select the number of additional blend cycles to purchase or otherwise add to the blender.

Figure 1D:
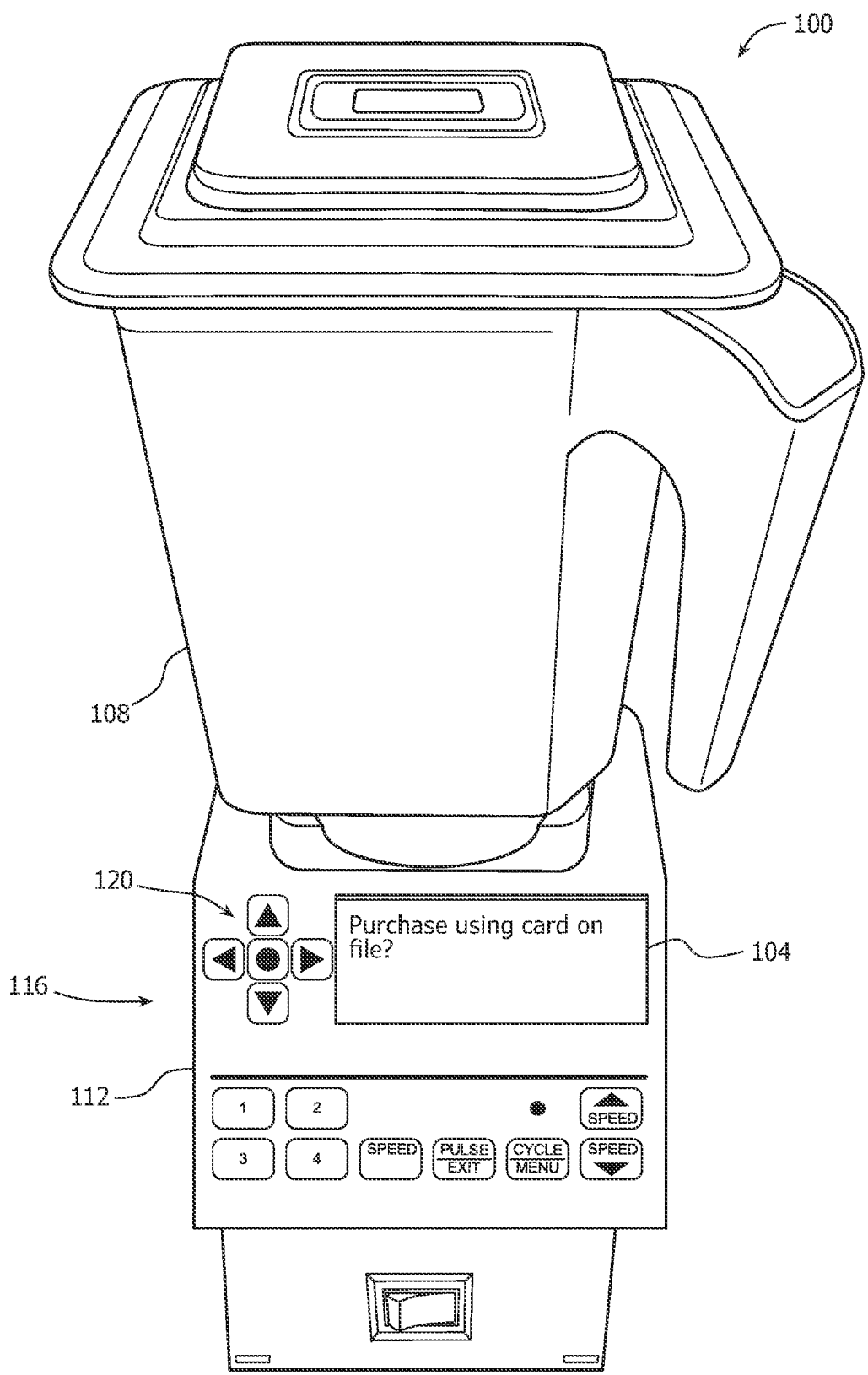
FIG. 1D illustrates the blender system of FIG. 1A with an option to purchase additional blend cycles using an existing account, according to one embodiment.

FIG. 1D illustrates the blender system 100 of FIG. 1A displaying an option to purchase additional blend cycles using an existing account, according to one embodiment. In various embodiments, the blender control system may be connected to a wireless network enabling purchases of blend cycles to be completed directly on the blender control system using stored credit card information or via an online user account. For example, the blender control system may be connected to the internet via Wi-Fi, via Bluetooth through a user's mobile device or a hub, via an Ethernet connection, via a 5G, LTE, 4G or other cellular connection, or through another communications network.

According to various embodiments, a cellular network interface is integrated within the blender base 112. The cellular network interface may be configured for automatic operation independent of any contract or subscription requirements on the part of the blender operator. For example, the cellular network interface may be operational and paid for by the manufacturer or distributor of the blender and not the end consumer. The cellular network interface may be used to monitor usage, provide over-the-air firmware and/or software updates, disable the device, location tracking, and/or other monitoring and/or control features.

For example, as described herein, the number of blend cycles and/or the blend time (e.g., in seconds, minutes, hours, etc.) may be uploaded from the blender 100 to a centralized system on a periodic basis (e.g., in real time, every few minutes, hours, daily, monthly, etc.). The blender operator may be charged according to the actual usage of the blender 100 during the last billing period. For example, the blender operator may be billed in real time for each blend cycle or blend time period, billed on a daily basis, a weekly basis, a monthly basis, a quarterly basis, a yearly basis, etc. In some embodiments, failed payments may result in the blender 100 being disabled or the functionality being otherwise reduced or modified.

Figure 1E:
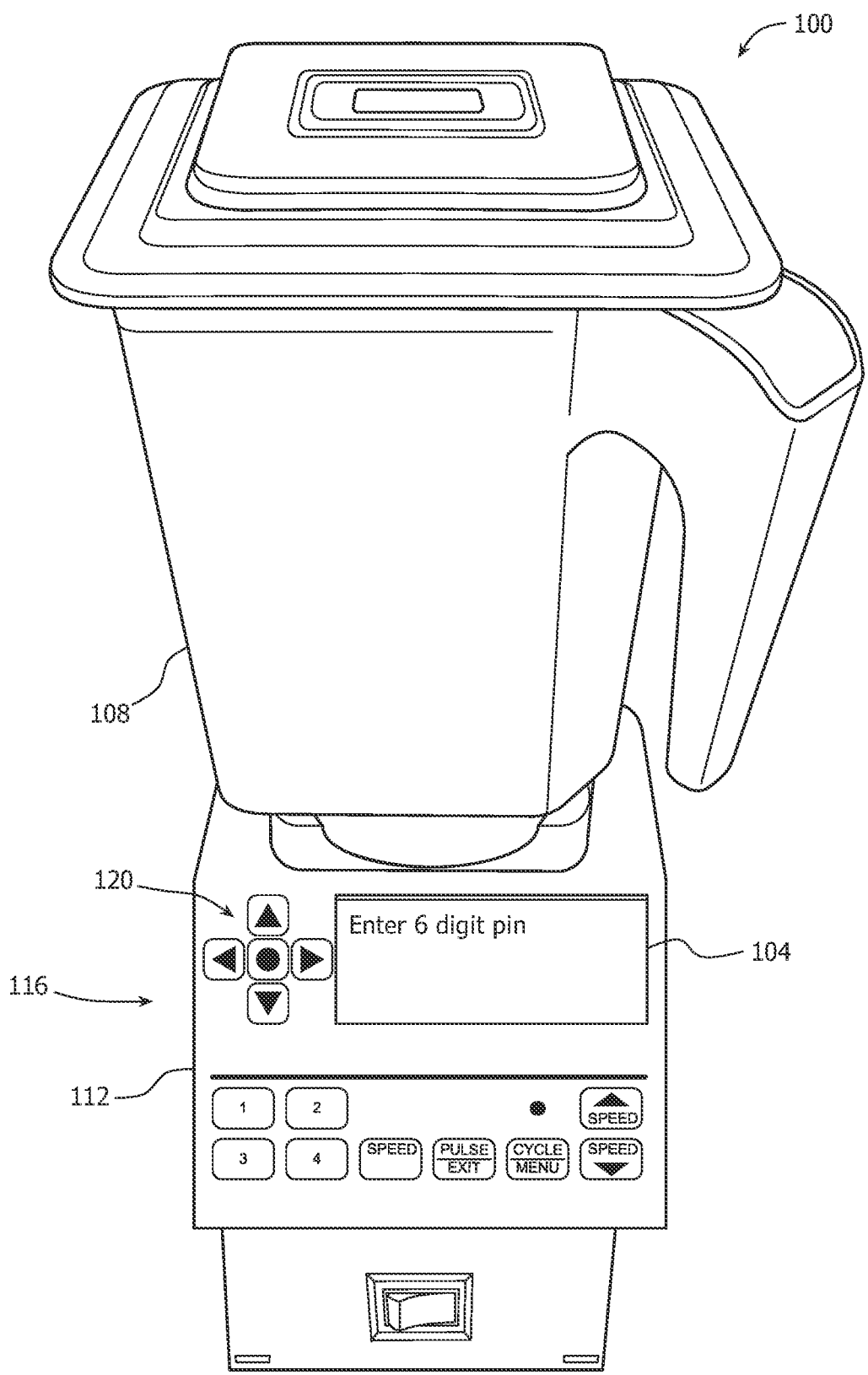
FIG. 1E illustrates the blender system of FIG. 1A with an option to enter a pin code to redeem additional blend cycles previously purchased, according to one embodiment.

FIG. 1E illustrates the blender system 100 of FIG. 1A displaying an option to enter a pin code to redeem additional blend cycles previously purchased, according to one embodiment. In some embodiments, a user may purchase additional blend cycles using in-person (e.g., via a redeemable gift card), over the phone, or online (e.g., through a mobile app or web browser). In some embodiments, the purchased blend cycles may be automatically added to the blender system 100 over a Wi-Fi or other communications network. In other instances, the purchase of additional blend cycles provisions the user with a pin code or other password that can be entered directly on the user interface 116 of the blender system 100 to increase the remaining blend cycle count.

In some embodiments, the pin code may be device-specific such that the purchased blend cycles can only be added to the specific blender system for which the purchased blend cycles were purchased. For example, the pin code may be based on the serial number or other unique identifier associated with the blender system. In another example, each blender system may be manufactured or pre-programmed with pin codes associated with specific blend cycle counts. The pre-programmed pin codes are kept secret from the end-user and provided in response to a request to purchase additional blend cycles. In other embodiments, pin codes may not be device-specific and may be entered on any blender system once purchased.

Figure 1F:
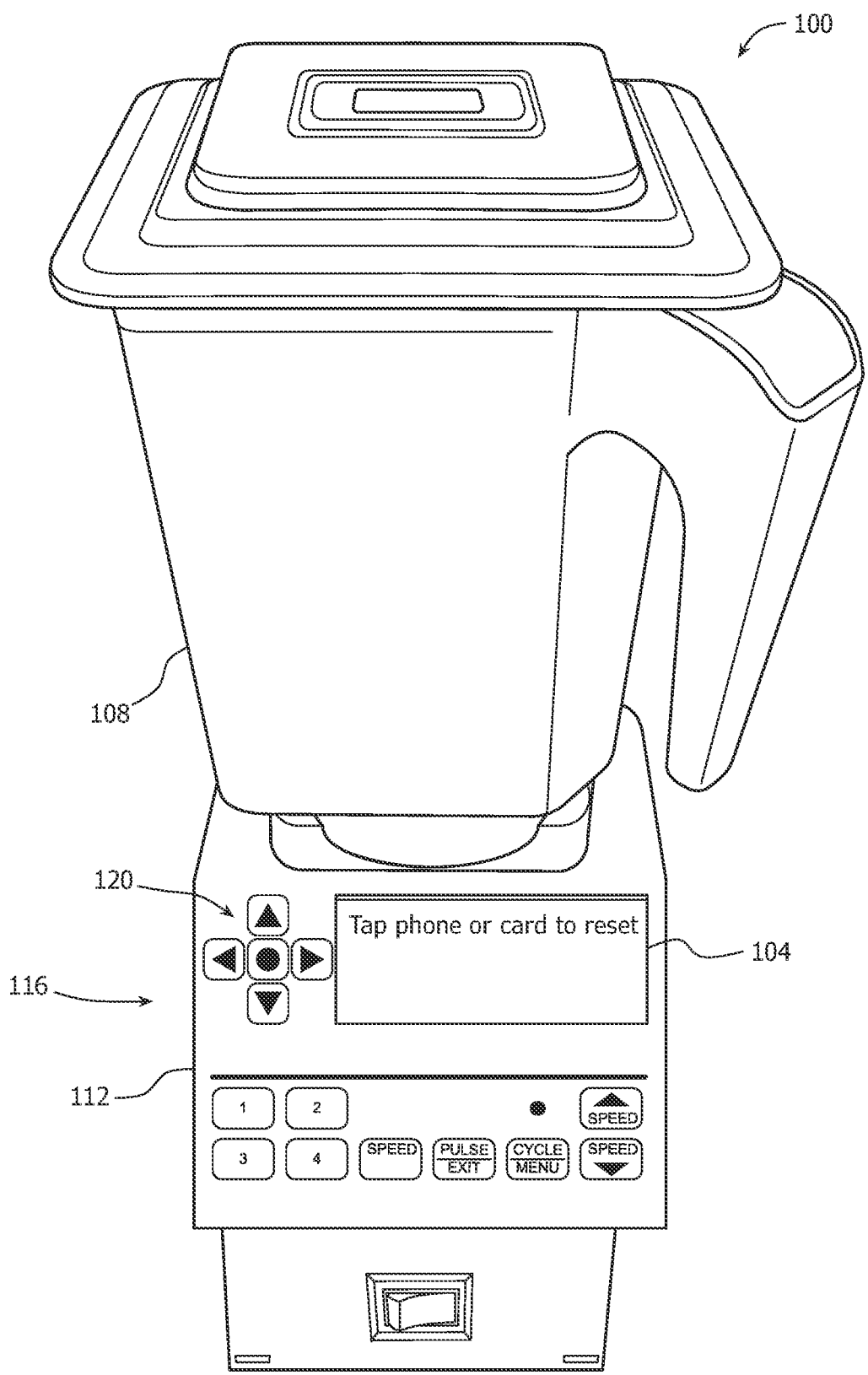
FIG. 1F illustrates the blender system of FIG. 1A with an option to purchase or redeem previously purchased blend cycles via a near-field communication (NFC) interface, according to one embodiment.

FIG. 1F illustrates the blender system 100 of FIG. 1A displaying an option to purchase or redeem previously purchased blend cycles via a near-field communication (NFC) interface, according to one embodiment. A user may use a mobile device to purchase additional blend cycles and then transfer the purchased blend cycles to the blender system 100 using NFC, Bluetooth, or another short-range wireless communication protocol.

Figure 1G:
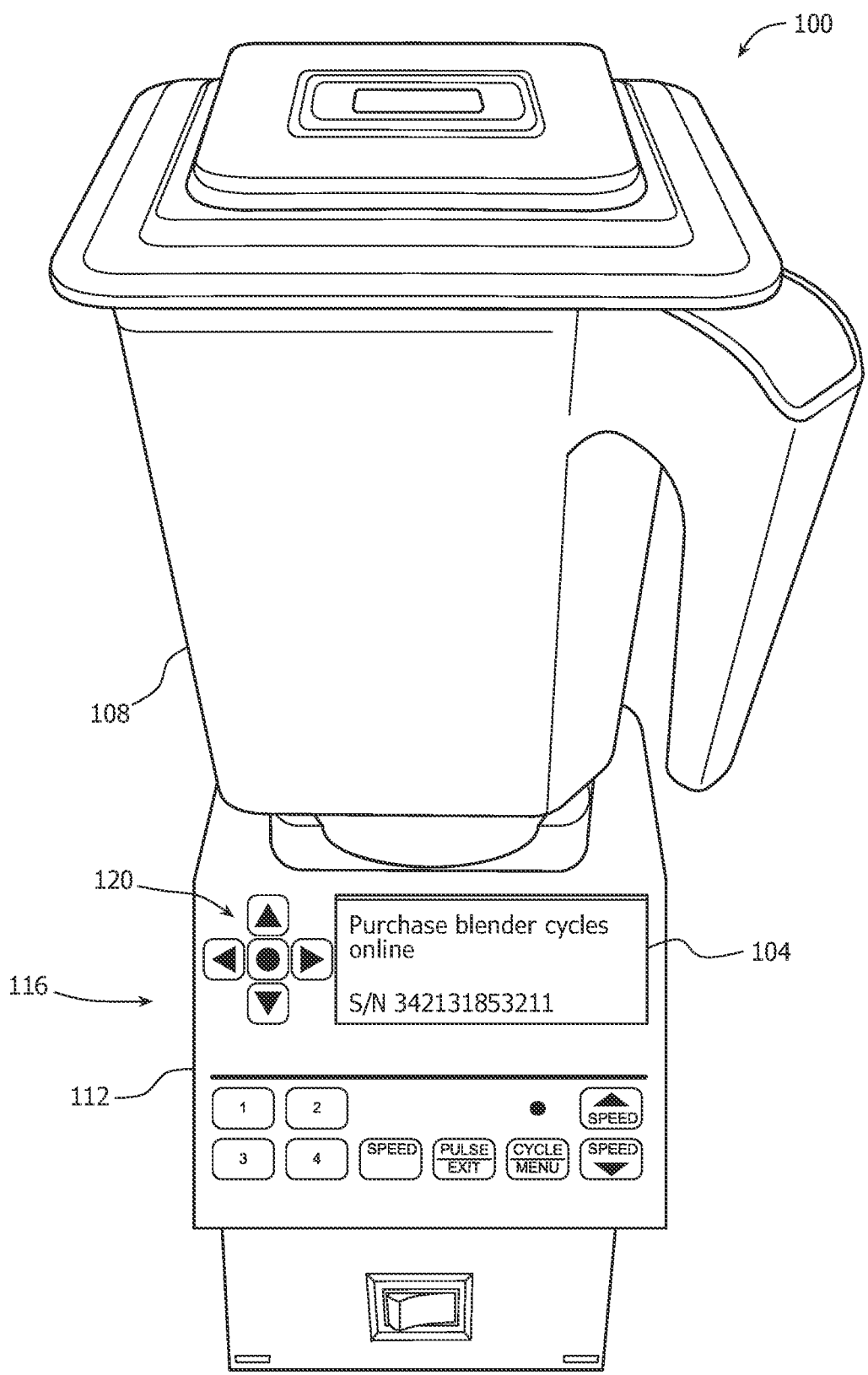
FIG. 1G illustrates the blender system of FIG. 1A with instructions to purchase additional blend cycles online using a serial number, according to one embodiment.

FIG. 1G illustrates the blender system 100 of FIG. 1A displaying instructions to purchase additional blend cycles online using a serial number, according to one embodiment. In the illustrated embodiment, the user may purchase additional blend cycles by phone or online by providing the serial number displayed on the display 104 of the blender system 100. The blender system 100 may be automatically updated to include the purchased blend cycles (e.g., via NFC or Bluetooth from a mobile device or over the internet via a Wi-Fi connection).

Figure 2A:
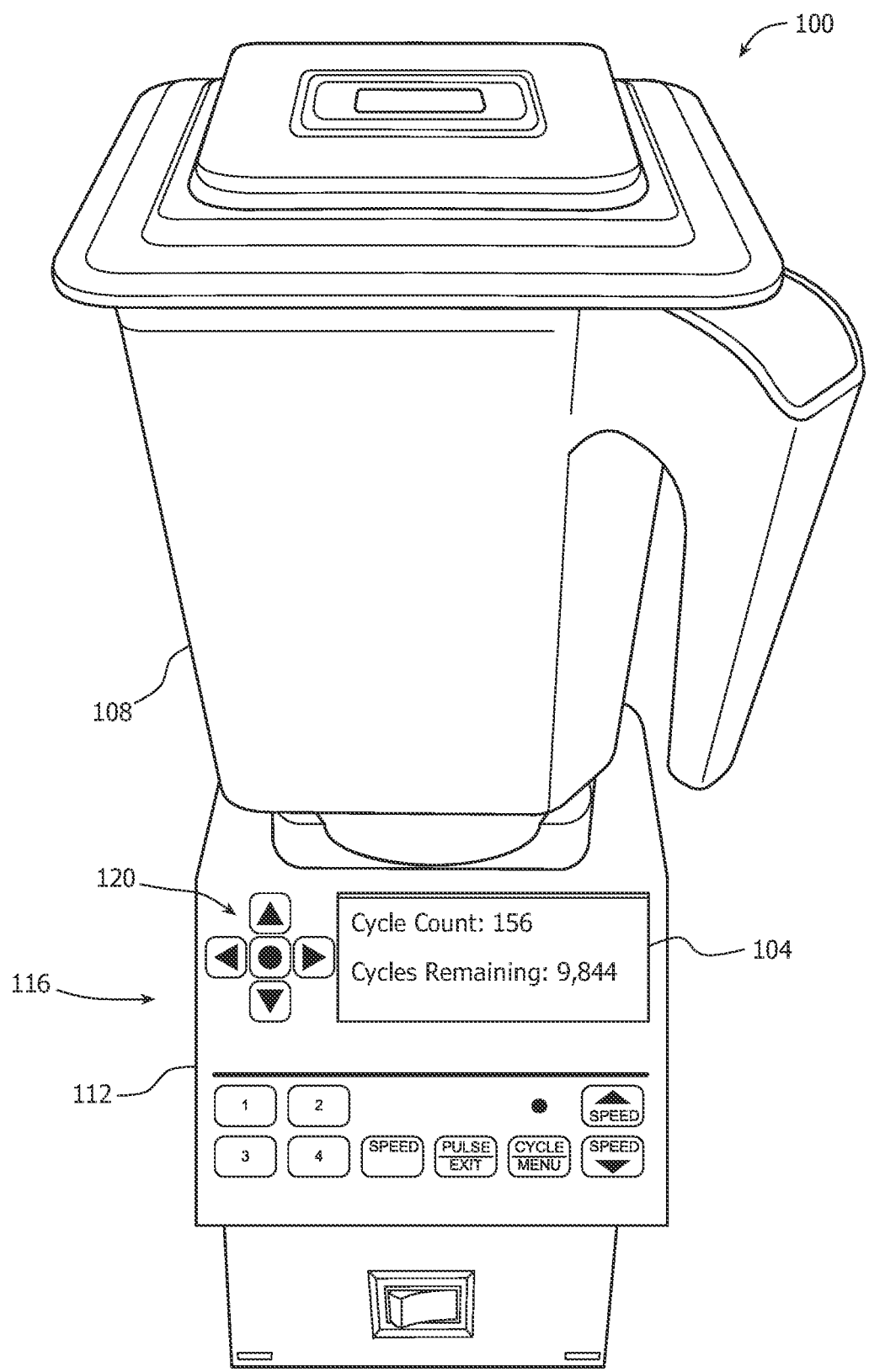
FIG. 2A illustrates a blender system with a control system displaying a bender cycle count and remaining blend cycle count, according to one embodiment.

FIG. 2A illustrates a blender system 100 with a control system displaying a bender cycle count and remaining blend cycle count, according to one embodiment. In some embodiments, blend cycles may be pre-purchased. In other embodiments, blend cycles may be post-paid. For example, the blender system 100 can be connected to a wireless network and may automatically update an online account on a monthly or another periodic basis. The blender system 100 may indicate the number of blend cycles completed during the billing cycle and the user may be billed accordingly.

For example, the blender system 100 may utilize a cellular network or other networking interface (e.g., Wi-Fi, ZigBee, etc.) to indicate the number of blend cycles and/or the number of seconds of blender usage. The blender operator (e.g., individual, business, corporate headquarters, etc.) may be charged on a periodic basis for the reported blender usage. In some embodiments, each blender in a store may be associated with a minimum period charge. For instance, each blender may be associated with a monthly minimum charge of $10 and a per second blend rate of $0.01. If the blender is not used at all, the minimum charge of $10 would apply. If the blender is used for 15 minutes, then the minimum charge of $10 would still apply (since 15 minutes*60 seconds/minutes*$0.01<$10). If the blender is used for 45 minutes, the charge would be $27.00.

In some embodiments, a centralized blender system (e.g., on a server) may calculate minimum charges on a per-blender basis where every blender is associated with a minimum charge each month and a blender-usage charge. In other embodiments, a set of blenders in a single location or a set of blenders in many locations may be associated with a single minimum monthly charge and a usage-based charge. For example, an operation with 100 blenders may be associated with a minimum monthly charge of $2,500 and a cumulative usage-based charge of $0.03 per every 30 seconds of blender usage. Each of the 100 blenders reports usage in real time or on a period basis using a network connection (e.g., an integrated cellular network interface). The centralized blender system determines if the cumulative usage is in excess of the monthly minimum charge and charges them either the usage-based fee or the monthly minimum.

In some embodiments, different monthly minimums and/or usage-based rates may be associated with different blender units, blenders in different locations, blenders in different states, and blenders used for different types of uses. Each blender may report its serial number, location, and/or other identifying information each time that it reports back to the centralized blender system. The manufacturer, distributor, or another lessor of the blender may charge different rates, assess taxes on a state-by-state basis, and/or otherwise monitor the usage of each blender in a multi-location, multi-state operation.

Figure 2B:
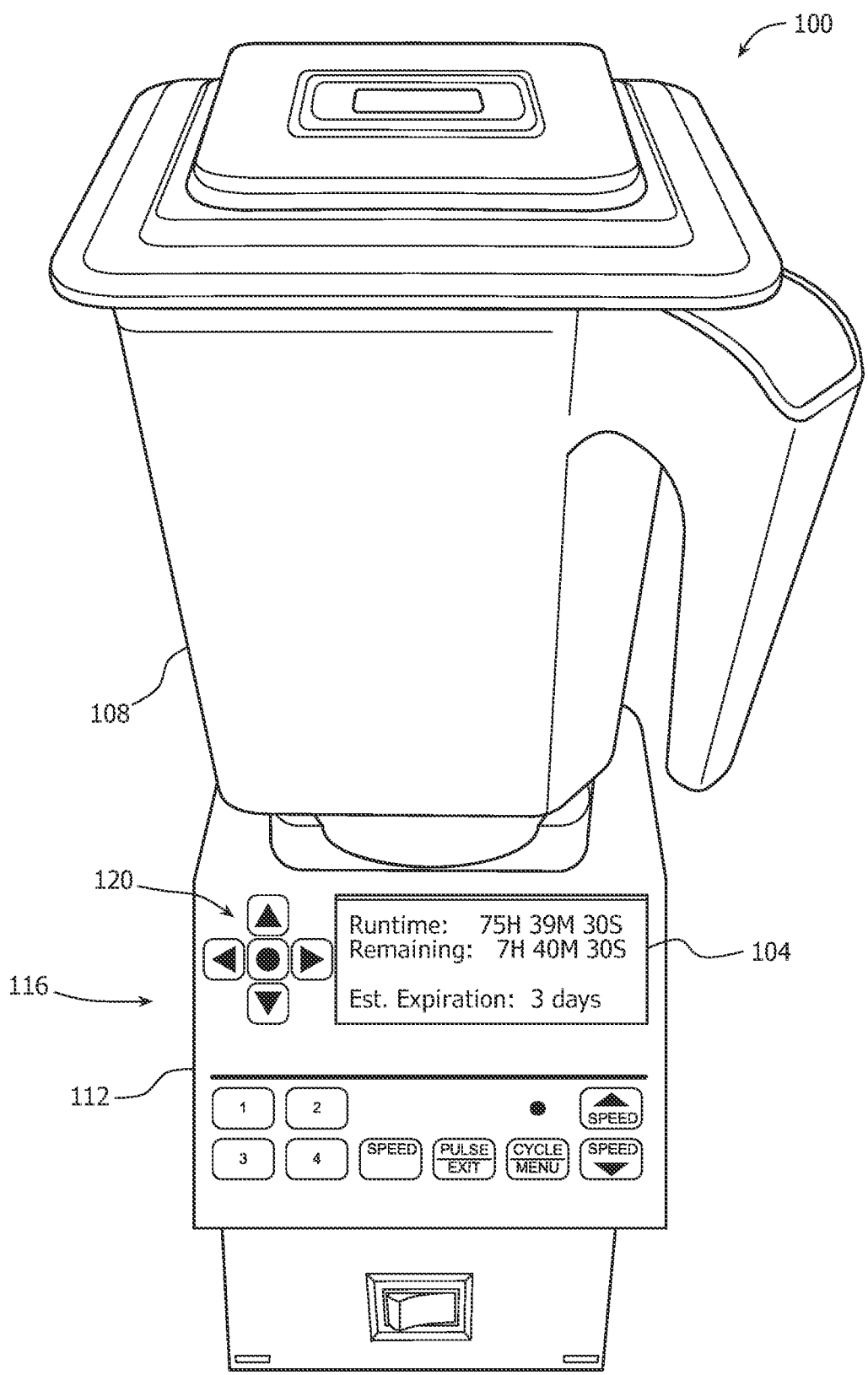
FIG. 2B illustrates a blender system with a control system displaying a bender runtime, remaining runtime, and an estimated number of days until expiration based on historical usage, according to one embodiment.

FIG. 2B illustrates a blender system 100 with a control system displaying a bender runtime, remaining runtime, and an estimated number of days until expiration based on historical usage, according to one embodiment. Many of the embodiments and examples described herein refer to blend cycles and blend cycle counts. However, it is appreciated that the blend cycles or blend cycle counts may be equated with or substituted by actual blend times. As illustrated, the blender system 100 may display a runtime of the blender system and/or a remaining blend time of the blender system. In some embodiments, the blender system 100 may estimate the remaining number of days or hours until the blender system 100 will become disabled based on historical usage data. For instance, if the blender system 100 is used approximately 2 hours each day and has approximately 8 hours of remaining blend time, the blender system 100 may display an estimated expiration of 4 days.

Figures 3A, 3B, 3C:
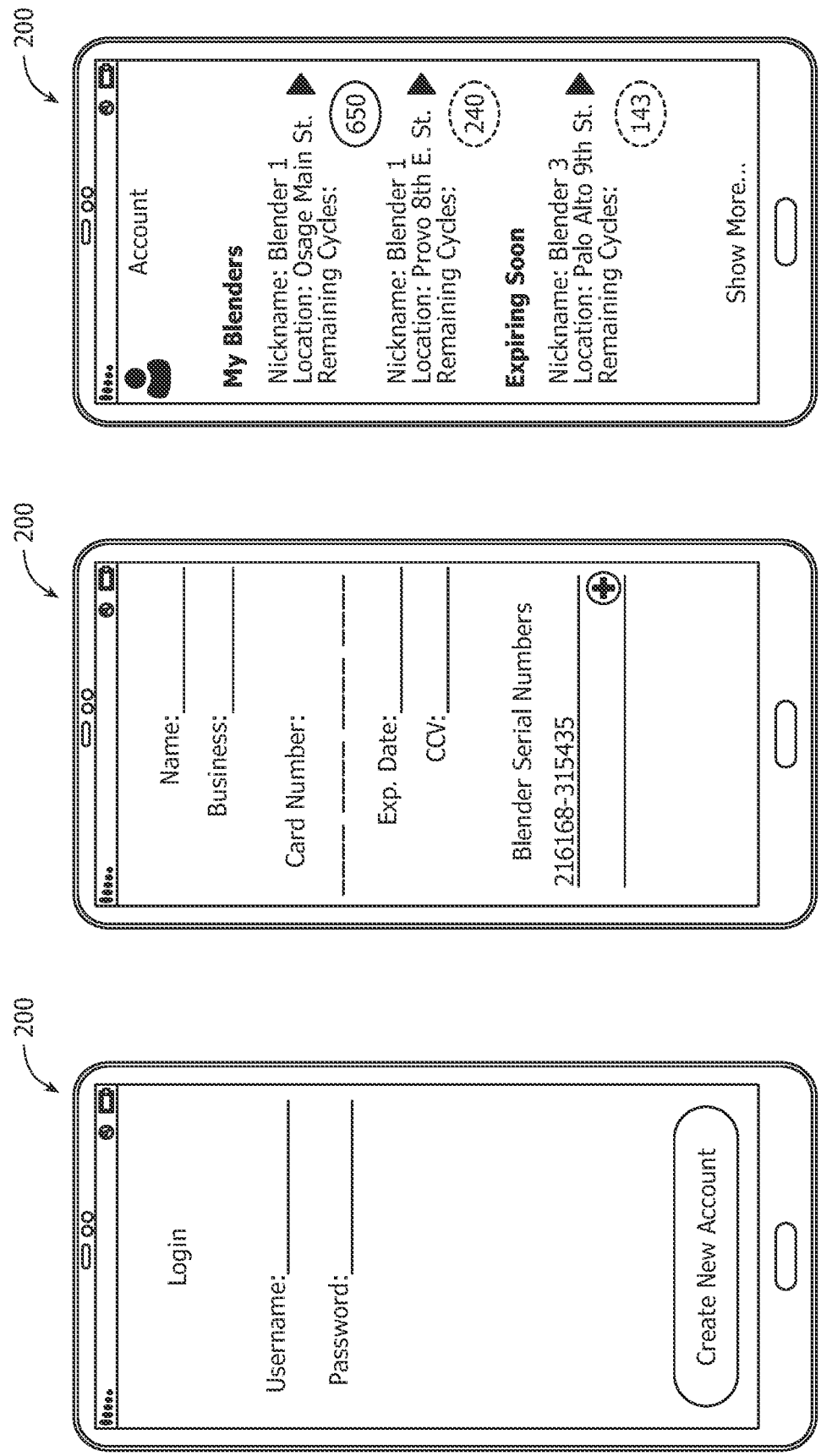
FIG. 3A illustrates a login screen of a mobile app associated with a control system of a blender system, according to one embodiment.
FIG. 3B illustrates a user interface of the mobile app to enter payment information and associate specific blender devices, according to one embodiment.
FIG. 3C illustrates a user interface of the mobile app to monitor and manage connected blender devices, according to one embodiment.

FIG. 3A illustrates a mobile device or an electronic device 200 displaying a login screen of a mobile application (also referred to as a "mobile app") associated with a control system of a blender system (e.g., the blender system 100), according to one embodiment. As illustrated, a user may use the mobile app on the electronic device 200 to create an account using a username and password. Any of a wide variety of user-authentication and login credential approaches may be utilized.

FIG. 3B illustrates the electronic device 200 displaying a user interface of the mobile app to enter payment information and associate specific blender devices, according to one embodiment. In some instances, a business account may include many blender systems, different model numbers, business locations, authorized users, or other information to help manage and organize large accounts with many blender systems in many locations.

FIG. 3C illustrates the electronic device 200 displaying a user interface of the mobile app to monitor and manage connected blender systems, according to one embodiment. In the illustrated example, three blender systems are managed that are each located in a different location. A remaining cycle count is shown for each blender system. In some embodiments, those blenders about to "expire" may be identified using different colors or shading to emphasize the urgency needed to purchase additional blend cycles.

Figure 3D:
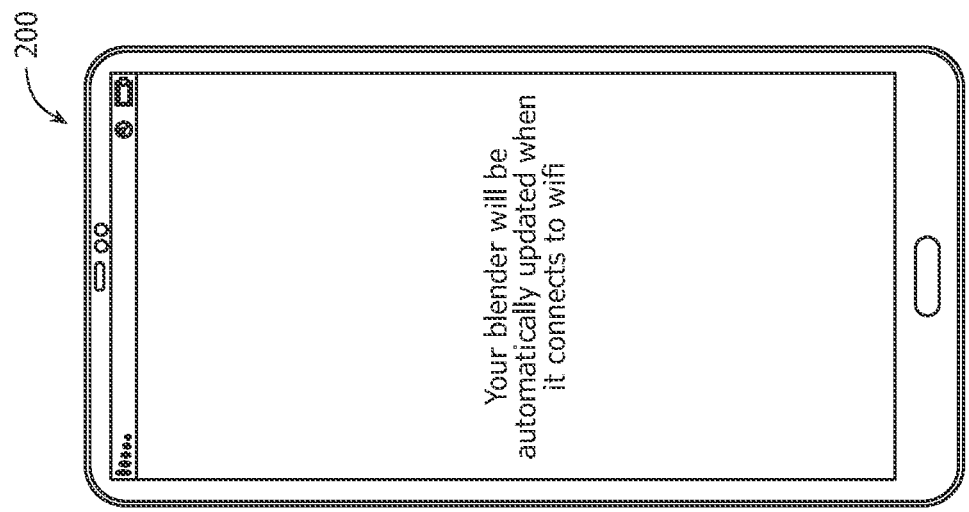
FIG. 3D illustrates a user interface to add blend cycles to a selected blender device, according to one embodiment.

FIG. 3D illustrates the electronic device 200 displaying a user interface to add blend cycles to a selected blender device "Blender 3," according to one embodiment. As illustrated, three commonly purchased increments of blend cycles may be displayed for the user to select. In some embodiments, custom blend cycle counts may be entered by the user. In some embodiments, auto-replenish features may allow blender systems to be automatically replenished when the remaining blend cycle count is zero or below a threshold value (e.g., a preprogrammed threshold value or a user-selected threshold value).

Figure 3E:
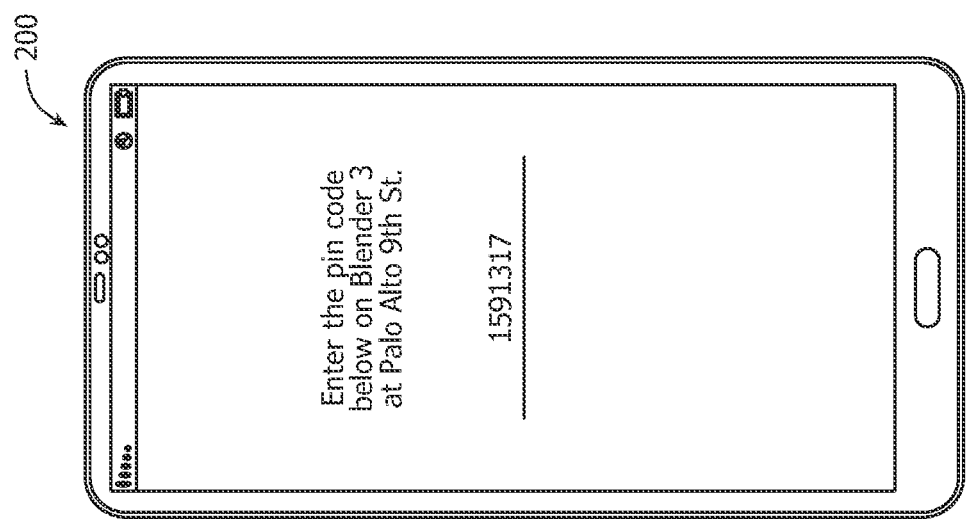
FIG. 3E illustrates a user interface displaying a pin code to be entered on the specific blender device for which additional blend cycles were purchased, according to one embodiment.

FIG. 3E illustrates the electronic device 200 with a user interface displaying a pin code to be entered on the specific blender device for which additional blend cycles were purchased, according to one embodiment. As previously described, especially in the case of non-networked blender systems, a pin code may be generated and manually entered on a blender system to add purchased blend cycles (or blend time).

Figure 3F:
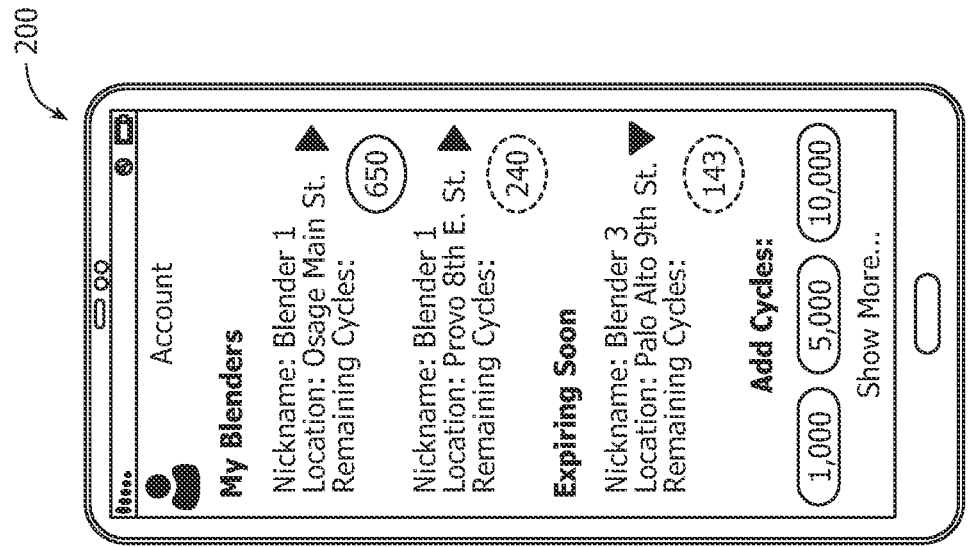
FIG. 3F illustrates a post-purchase notification that purchased blend cycles will be automatically added to the blender device when it is connected to Wi-Fi, according to one embodiment.

FIG. 3F illustrates the electronic device 200 displaying a post-purchase notification that purchased blend cycles will be automatically added to the blender device when it is connected to Wi-Fi, according to one embodiment. In another embodiment, a confirmation screen may simply alert the user that the purchase was successful and that the blender system will be automatically updated to include the newly purchased blend cycles once it is connected to the user device, a communication hub, or the internet (e.g., via a low-power wide-area network such as LoRa network, Wi-Fi or a 5G network).

Figure 3H:
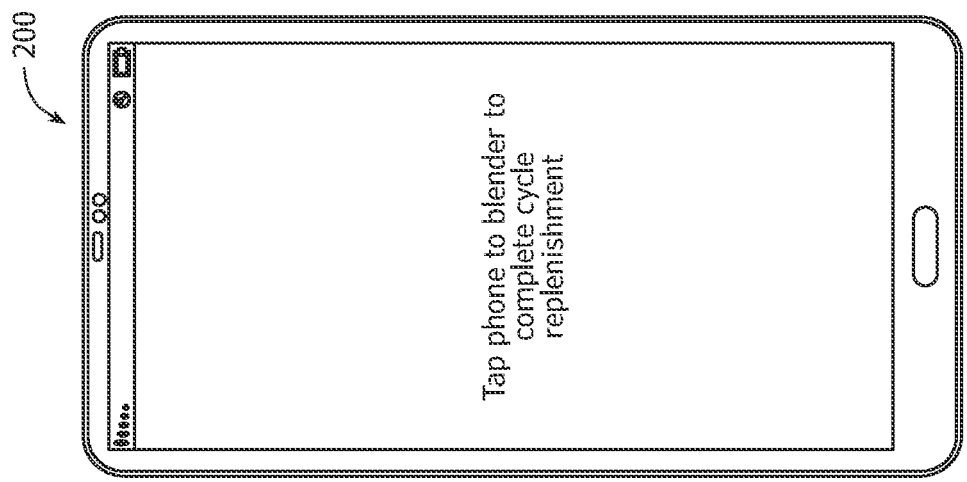
FIG. 3H illustrates a post-purchase notification that purchased blend cycles will be automatically added to the blender device using NFC via a mobile device, according to one embodiment.
Figure 3G:
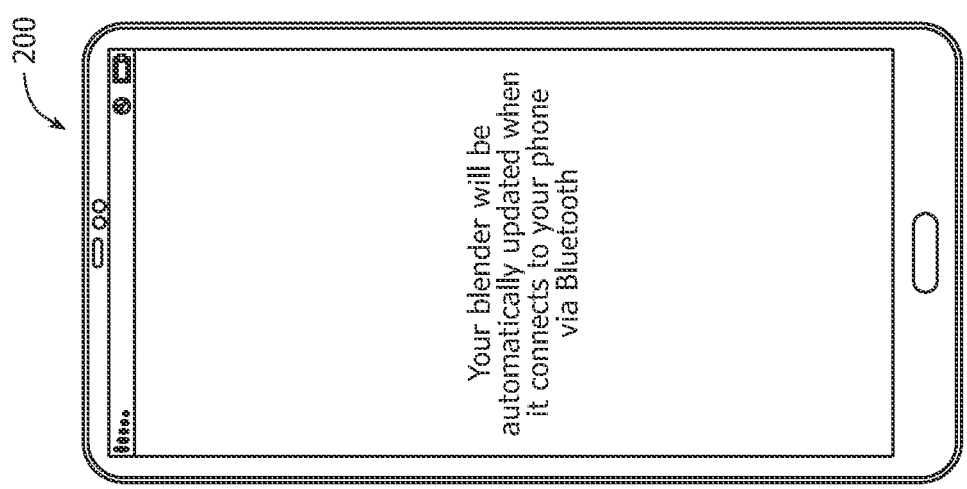
FIG. 3G illustrates a post-purchase notification that purchased blend cycles will be automatically added to the blender device when it is connected to a mobile device via Bluetooth, according to one embodiment.

FIG. 3G illustrates the electronic device 200 displaying a post-purchase notification that purchased blend cycles will be automatically added to the blender device when it is connected to a mobile device via Bluetooth, according to one embodiment.

FIG. 3H illustrates the electronic device 200 displaying a post-purchase notification that purchased blend cycles will be automatically added to the blender device using NFC via a mobile device (such as the electronic device 200), according to one embodiment. As previously described, other communication protocols, including those involving RFID technology, Wi-Fi, and/or other short-range communication protocols may be used to connect the blender system to a mobile device or Internet-connected hub.

Figure 4:
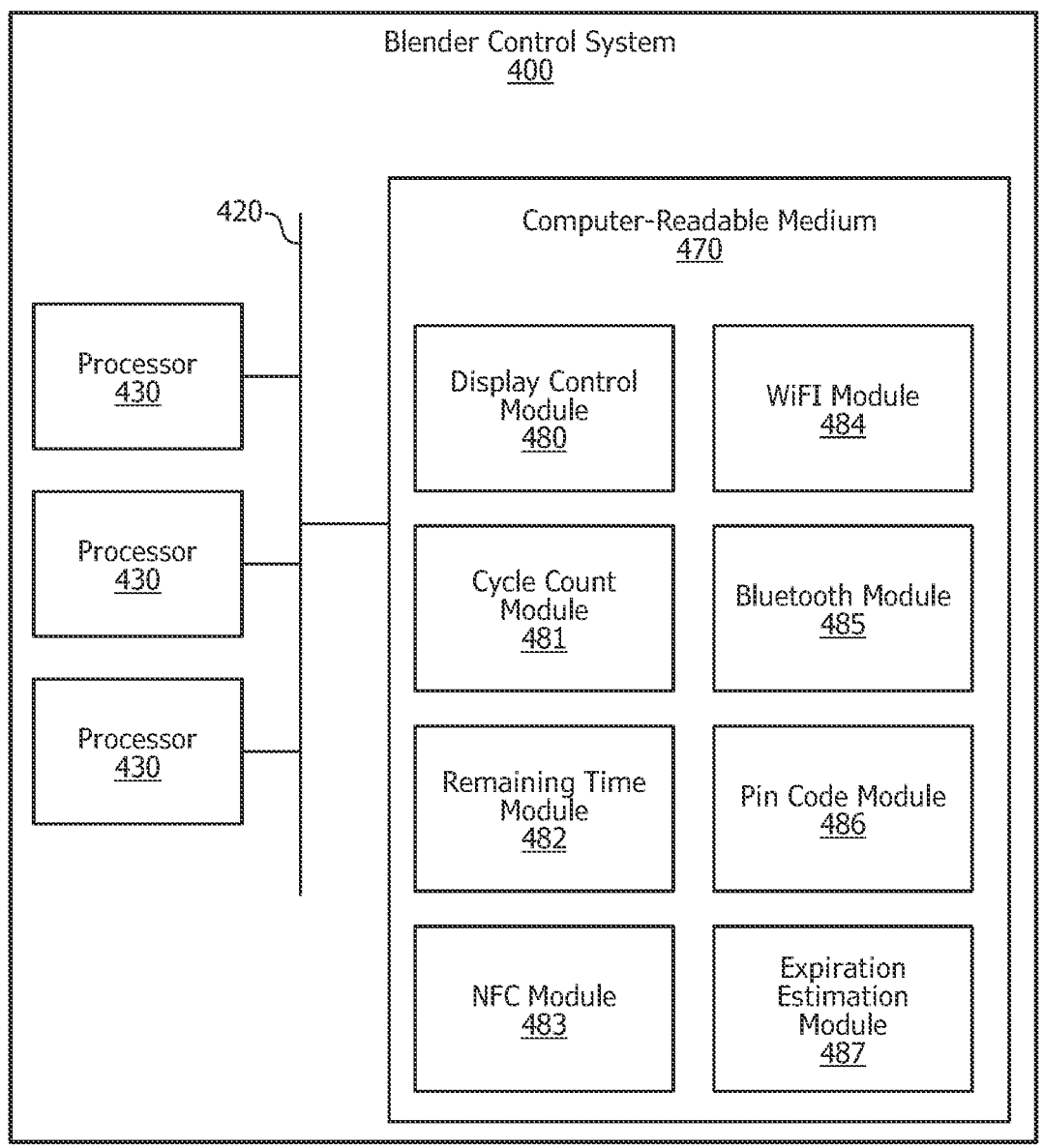
FIG. 4 illustrates a block diagram of a blender control system to limit operation based on purchased blend cycles and facilitate the purchase of additional blend cycles, according to one embodiment.

FIG. 4 illustrates a block diagram of a blender control system 400 to limit operation of a blender system based on purchased blend cycles and facilitate the purchase of additional blend cycles, according to one embodiment. As illustrated, the blender control system 400 may include a processor 430, memory 440, communication interfaces 455, and a computer-readable medium 470 that are all interconnected via a bus 420. The computer-readable medium 470 may include various modules in the form of computer-readable instructions that are executable by the processor 430 to cause the blender control system 400 to perform certain operations. While some embodiments of a blender control system 400 may include all of the components and modules illustrated, other embodiments of a blender control system 400 (including many of the embodiments described herein) may only include a subset of the components and modules illustrated. In still other embodiments, some of the modules and/or components may be embodied as hardware components instead of as computer-executable instructions (e.g., using an FPGA, PLA, or an ASIC).

The communications interfaces 455 may include network communication interfaces (e.g., Wi-Fi, cellular, Bluetooth, NFC, RFID, LoRa, ZigBee, or the like) and internal communication interfaces to, for example, control an electronic display, receive input via a control interface (e.g., touchscreen or buttons), and control the motor speed of the motor used to drive the blades of the blender.

A display control module 480 may control an electronic display (such as the display 104) of the blender system. A cycle count module 481 may maintain a lifetime and/or resettable cycle counts of the number of blend cycles. A remaining time module 482 may maintain an amount of time remaining until the blender will be disabled or partially disabled until more blend time (or blend cycles) are added. An NFC module 483 may include computer-executable instructions and/or hardware components to facilitate communication via near field communication ("NFC"). A Wi-Fi module 484 may include computer-executable instructions and/or hardware components to facilitate communication via Wi-Fi. A Bluetooth module 485 may include computer-executable instructions and/or hardware components to facilitate communication via Bluetooth.

A pin code module 486 may facilitate the entry of pin codes on an interface of the blender system to increase the remaining cycle count or remaining runtime of the blender system. An expiration estimation module 487 may provide an estimate of the remaining number of years, months, weeks, days, hours, or seconds until the blender system is locked, disabled, partially disabled, or otherwise restricted due to the exhaustion of pre-purchased blend cycles or blend runtime.

Figure 5:
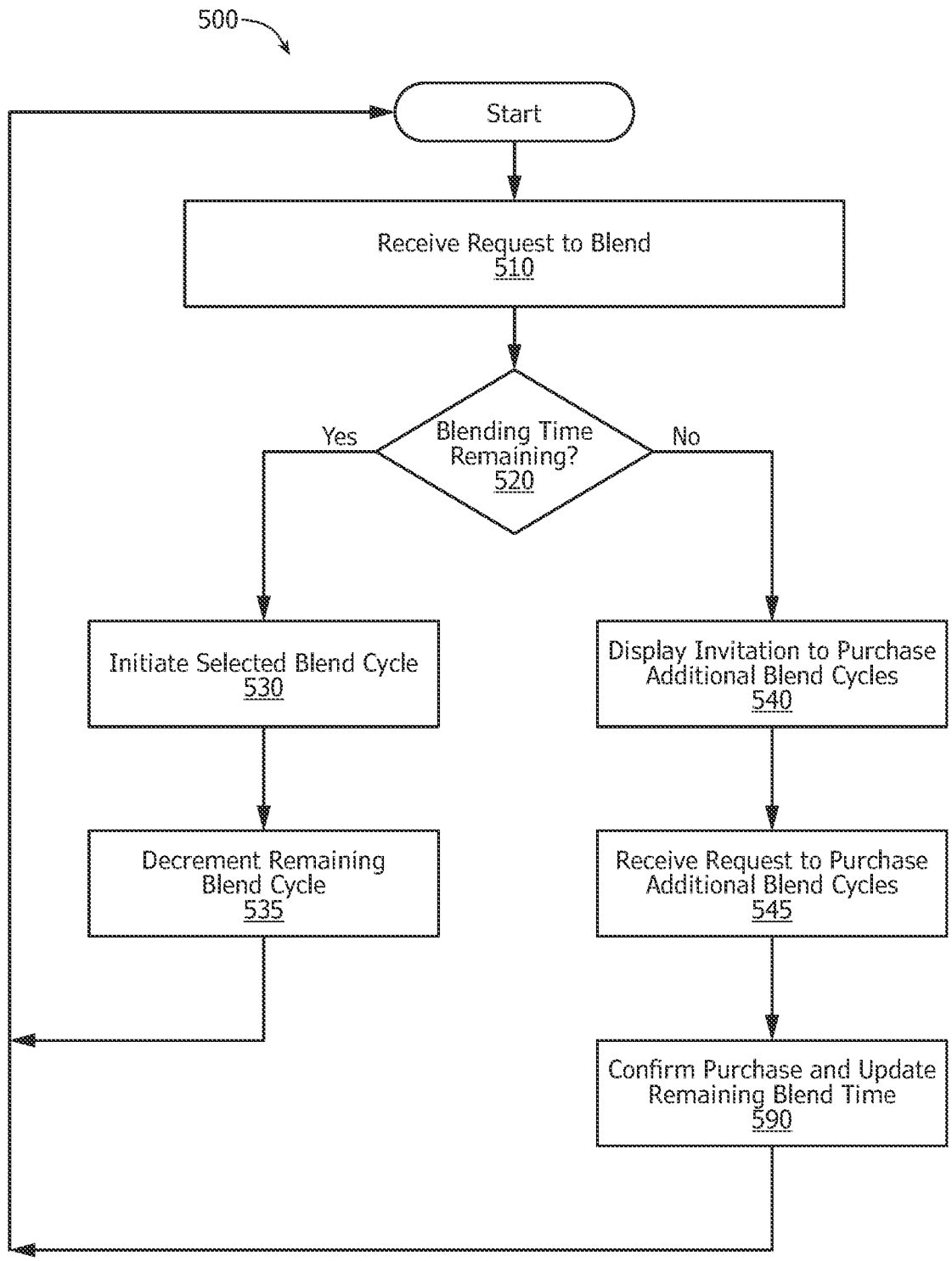
FIG. 5 illustrates a flow chart of a method to limit the operation of a blender system to purchased blend cycles and facilitate the purchase of additional blend cycles, according to one embodiment.

FIG. 5 illustrates a flow chart of a method 500 to limit the operation of a blender system (such as the blender system 100) to purchased blend cycles and facilitate the purchase of additional blend cycles, according to one embodiment. At step 510, the blender control system may receive a request to initiate a blend cycle. The request to blend may be associated with a number of blend cycles (e.g., 1 or more) and/or a blend runtime (e.g., a number of seconds or minutes). For example, a preprogrammed "Smoothie" blend cycle may be associated with a single blend cycle, while a more intensive preprogrammed "Hot Soup" blend cycle may be associated with 3 blend cycles. The blender control system may determine, at step 520, if the remaining blend cycle count and/or remaining blend runtime is sufficient to implement the requested blend cycle.

If the remaining blend cycle count and/or remaining blend runtime is sufficient, then the blender control system initiates, at step 530, the selected blend cycle and decrements, at step 535, the remaining blend cycle count (or runtime) accordingly. If the remaining blend cycle count and/or remaining blend runtime is not sufficient, then the selected blend cycle is not implemented.

In some embodiments, the blender control system may cause an alert to appear on an electronic display of the blender system itself, on a display of a connected hub device, or as a notification within a mobile app of a cellular phone or tablet device. In other embodiments, notifications may be sent regarding failed attempts to operate the blender system and/or low remaining blend cycle counts via email, text message, audible sounds, haptic feedback, lights, or the like.

As illustrated, in some embodiments, the blender control system may display, at step 540, an invitation to purchase additional blend cycles. The blender control system may receive, at step 545, via an electronic interface on the blender system, via the internet, or via a connected mobile device, a request to purchase additional blend cycles. The blender control system may, at step 590 confirm the purchase of the additional blend cycles (or additional runtime) and update the remaining blend cycle count (or remaining blend runtime). In some instances, the blender control system may then immediately implement the originally requested blend cycle, at step 530. In other instances, the blender control system may ignore the previously requested blend cycle and wait to receive, at step 510, a new request to blend.

Specific embodiments and applications of the disclosure are described above and illustrated in the figures. It is, however, understood that many adaptations and modifications can be made to the precise configurations and components detailed above. Again, in some cases, well-known features, structures, or operations are not shown or described in detail. Furthermore, the described features, structures, or operations may be combined in any suitable manner in one or more embodiments. It is also appreciated that the components of the embodiments as generally described and illustrated in the figures herein could be arranged and designed in a wide variety of different configurations. That is, all feasible permutations and combinations of embodiments are contemplated.

In the description above, various features are sometimes grouped together in a single embodiment, figure, or description thereof for the purpose of streamlining the disclosure. It will be apparent to those having skill in the art that changes may be made to the details of the above-described embodiments without departing from the underlying principles of the invention.

What is claimed is:

1. A blender system, comprising:
   a blender;
   a processor housed by the blender; and
   a memory housed by the blender and storing computer-executable instructions that, when executed by the processor, cause the blender system to:
   monitor usage of the blender;
   at least partially disable blending in response to a blend cycle count being insufficient to perform a requested blend cycle;
   increase the blend cycle count in response to a purchase of additional blend cycles or additional runtime; and
   reenable blending based on the increased blend cycle count.

2. The blender system of claim 1, wherein the blend cycle count comprises a blend runtime.

3. The blender system of claim 1, further comprising a user interface.

4. The blender system of claim 1, wherein the blend cycle count is decremented by one in response to the requested blend cycle.

5. The blender system of claim 1, wherein the blend cycle count is decremented by more than one in response to the requested blend cycle.

6. The blender system of claim 1, wherein a blend cycle request that involves higher blend speeds or longer blend times causes the blend cycle count to decrement by more than one.

7. The blender system of claim 1, wherein the blend cycle count is decremented based on a runtime of a selected blend cycle.

8. The blender system of claim 1, wherein the blend cycle count is decremented based on a blend speed of a selected blend cycle.

9. The blender system of claim 1, wherein the blender system is connected to a mobile device.

10. The blender system of claim 1, wherein the blender system is at least partially controlled through a mobile application interface.

11. The blender system of claim 1, wherein the blender system is configured to estimate a remaining runtime until the blender system will be disabled, based on historical usage data.

12. The blender system of claim 1, wherein:
    the blender comprises an operational limit of available blend cycles or available runtime allotted to operate the blender;
    at least partially disabling blending occurs when the blend cycle count exhausts the operational limit of available blend cycles or available runtime; and
    increasing the blend cycle count at least partially replenishes the blend cycle count to a level sufficient to perform the requested blend cycle.

13. A method for operating a blender system, the method comprising:

receiving a request to initiate a blend cycle;

determining if a remaining blend cycle count is sufficient to implement the requested blend cycle;

initiating the requested blend cycle in response to determining that the remaining blend cycle count is sufficient to implement the blend cycle; and decrementing the remaining blend cycle count based on the initiated blend cycle.

14. The method of claim 13, further comprising notifying a user if it is determined that the remaining blend cycle count is not sufficient to implement the requested blend cycle.

15. The method of claim 13, wherein the blend cycle is associated with a number of blend cycles or a blend runtime.

16. A non-transitory computer-readable medium having stored contents that cause a device to perform operations, the operations comprising:

receiving a request to initiate a blend cycle;

determining, by the device, if a remaining blend cycle count is sufficient to implement the blend cycle;

initiating, by the device, the blend cycle in response to determining that the remaining blend cycle count is sufficient to implement the blend cycle; and decrementing, by the device, the remaining blend cycle count based on the blend cycle.

17. The non-transitory computer-readable medium of claim 16, wherein the operations further comprise increasing, by the device, the remaining blend cycle count.

18. The non-transitory computer-readable medium of claim 16, wherein the device is connected to a centralized blender control system configured to operate multiple blenders.

19. The non-transitory computer-readable medium of claim 16, wherein the operations further comprise managing multiple blender systems.

20. The non-transitory computer-readable medium of claim 16, wherein the non-transitory computer-readable medium is a mobile application executed on a mobile device.

* * * * *